(12) United States Patent
Guadagno et al.

(10) Patent No.: US 8,273,806 B2
(45) Date of Patent: Sep. 25, 2012

(54) PROCESS FOR PREPARING A SELF-HEALING COMPOSITE MATERIAL

(75) Inventors: Liberata Guadagno, Fisciano (IT); Pasquale Longo, Capaccio (IT); Marialuigia Raimondo, Eboli (IT); Annaluisa Mariconda, Baronissi (IT); Carlo Naddeo, Pontecagnano Faiano (IT); Andrea Sorrentino, Palma Campania (IT); Vittoria Vittoria, Naples (IT); Generoso Iannuzzo, Avellino (IT); Salvatore Russo, Quarto (IT); Erika Calvi, Montoro Superiore (IT)

(73) Assignee: Alenia Aeronautica S.p.A. (IT)

( * ) Notice: Subject to any disclaimer, the term of this patent is extended or adjusted under 35 U.S.C. 154(b) by 150 days.

(21) Appl. No.: 12/586,993

(22) Filed: Sep. 30, 2009

(65) Prior Publication Data

US 2010/0168280 A1  Jul. 1, 2010

(30) Foreign Application Priority Data

Oct. 2, 2008  (IT) .............................. TO2008A0723

(51) Int. Cl.
  *C08K 9/10* (2006.01)
(52) U.S. Cl. .................. 523/211; 523/205; 548/103
(58) Field of Classification Search .................. 523/211, 523/205; 548/103
  See application file for complete search history.

(56) References Cited

U.S. PATENT DOCUMENTS

| | | | |
|---|---|---|---|
| 3,980,604 A * | 9/1976 | Whiting et al. | 523/401 |
| 6,518,330 B2 | 2/2003 | White et al. | |
| 6,921,735 B2 * | 7/2005 | Hoveyda et al. | 502/152 |
| 2002/0111434 A1 | 8/2002 | White et al. | |

FOREIGN PATENT DOCUMENTS

| WO | WO 02/064653 A2 | 8/2002 |
|---|---|---|
| WO | WO 2009/113025 A1 | 9/2009 |

OTHER PUBLICATIONS

Wakamatsu et al, "A New Highly Efficient Ruthenium Metathesis Catalyst," Angew. Chem. 2002, 114, Nr. 13, pp. 2509-2511.*
Kessler, M.R. et al, "Self-Healing Structural Composite Materials," Composites Part A: Applied Science and Manufacturing, Elsevier Science Publishers, vol. 34, Aug. 1, 2003, pp. 743-753.
Brown, E.N. et al, "In Situ Poly(Urea-Formaldehyde) Microencapsulation of Dicyclopentadiene," Journal of Microencapsulation, Taylor & Francis Ltd., publishers, vol. 20, No. 6, Nov. 1, 2003, pp. 719-730.

* cited by examiner

*Primary Examiner* — Vickey Nerangis
(74) *Attorney, Agent, or Firm* — Husch Blackwell LLP

(57) ABSTRACT

The process for preparing a self-healing composite material comprising a matrix of epoxy polymer, in which a catalyst of ring opening metathesis reaction and microcapsules containing a cyclic olefin having 7 to 40 carbon atoms are dispersed, comprises the steps of:
  preparing a mixture of
    a precursor of the epoxy polymer, having at least one oxirane ring,
    a curing agent chosen from the group consisting of tertiary amines, a Hoveyda-Grubbs II metathesis catalyst reaction, having the formula (I), wherein Ar=aryl having at least one halogen or alkyl substituent and "R=alkyl with 1 to 20 carbon atoms, and
    microcapsules containing a cyclic olefin having 7 to 40 carbon atoms; and
  heating the mixture at a temperature comprised between 25 and 130° C. for at least 1 hour, so as to obtain such matrix of epoxy polymer due to a reaction between precursor and curing agent, which reaction does not substantially involve either said catalyst or said microcapsules.

10 Claims, 5 Drawing Sheets

PROCESS FOR PREPARING A SELF-HEALING COMPOSITE MATERIAL

The present invention relates to the field of composite materials with a matrix of thermosetting polymer, which are capable of self-healing, namely to autonomously develop a healing process that restores the matrix continuity before the micro-cracks formed therein can propagate, thus seriously compromising the structure integrity.

Such as described in, for example, U.S. Pat. No. 6,518,330, in the matrix of such materials powders of catalyst of ring opening metathesis reaction and microcapsules containing a reactive monomer capable of polymerizing due to a ring opening metathesis reaction (ROMP), and subsequently of curing, are dispersed. Therefore, when a crack which is formed in such material reaches a microcapsule, the latter is broken, causing the leakage of the monomer. The latter, coming into contact with the catalyst, polymerizes and subsequently cures, so as to obstruct the crack and to restore the matrix structural continuity. A field of choice for the use of these materials is that of the aeronautical structural components.

International Patent Application No. PCT/IB2009/051005 by the present Applicant describes specific materials of the above-indicated kind, wherein 5-ethylidene-2-norbornene (ENB) is used as a reactive monomer, thus obtaining an improvement in the polymerization reaction kinetics and the yield of healing cross-linked product.

For the preparation of the matrix of such composite materials, a thermosetting polymer precursor is mixed with a curing agent, and they are reacted at temperatures of the order of 100-180° C., so as to obtain the matrix of thermosetting polymer. In addition, the metathesis catalyst and the microcapsules containing the reactive monomer also have to be already present in such mixture, so as to remain encompassed in the matrix which has been formed to ensure, in case of needs arisen later in the use of the material, the above-mentioned self-healing functionality.

Moreover, critical issues have been identified in the case of the use of precursors of an epoxy polymer—thus containing oxirane rings—in conjunction with Hoveyda-Grubbs II metathesis catalysts, that is, having the formula I reported below

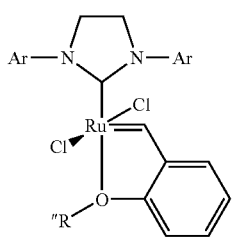

(I)

wherein Ar=aryl having at least one halogen or alkyl substituent and "R=alkyl with 1 to 20 carbon atoms.

In particular, it has been found experimentally that a reaction takes place between the oxirane rings of the precursors and the metathesis catalyst, which thereby was not subsequently capable of promoting the polymerization of the reactive monomer, thus deteriorating the self-healing ability.

Therefore, such phenomena have thus far greatly limited the use in the practice, in self-healing composite materials, of Hoveyda-Grubbs II catalysts, preventing a proper exploiting of the excellent intrinsic properties of the latter. In fact, such catalysts have a very high decomposition temperature, of the order of 232° C., and therefore they would be per se suitable to promote the reactive monomer polymerization up to such high temperatures, as well as at low temperatures even below −50° C.

Therefore, the object of the present invention is to overcome the critical issues of the prior art pointed out above.

Such object is achieved thanks to a process for preparing a self-healing composite material comprising a matrix of epoxy polymer in which a catalyst of ring opening metathesis reaction and microcapsules containing a cyclic olefin having 7 to 40 carbon atoms are dispersed, said process comprising the steps of preparing a mixture of a precursor of said epoxy polymer, having at least one oxirane ring, a curing agent chosen from the group consisting of tertiary amines, a Hoveyda-Grubbs II metathesis catalyst reaction, having the formula I

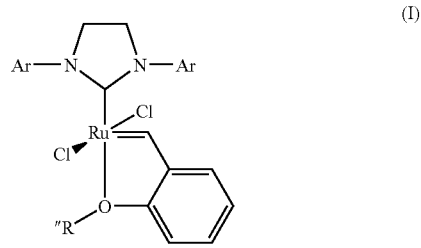

(I)

wherein Ar=aryl having at least one halogen or alkyl substituent and "R=alkyl with 1 to 20 carbon atoms, and microcapsules containing a cyclic olefin having 7 to 40 carbon at oms; and heating said mixture at a temperature comprised between 25 and 130° C. for at least 1 hour, so as to obtain said matrix of epoxy polymer due to a reaction between precursor and curing agent, which does not substantially involve either said catalyst or said microcapsules.

In the process of the invention, the selection of a relatively low temperature of the heating step, in conjunction with specific curing agents, make so that only the latter, and not the catalyst, react with the precursor oxirane rings. Therefore, the catalyst remains intact in the formed epoxy matrix, and is thus capable of subsequently performing its catalytic activity of the polymerization of the reactive monomer consisting in the cyclic olefin, when the latter comes out of a microcapsule affected by a crack.

Non-exhaustive examples of tertiary amines that can be used as curing agents in the process of the invention are: 2,4,6-tris(dimethylaminomethyl)phenol, triethylenediamine, N,N-dimethylpiperidine, benzyldimethylamine, 2-(dimethylaminomethyl)phenol.

Non-exhaustive examples of precursors of epoxy resin, having at least one oxirane ring that can be used in the process of the invention are phenol glycidyl ethers, glycidyl amines, cycloaliphatic resins, and multifunctional resins, especially diglycidyl ether of bisphenol A (DGEBA), diglycidyl ether of bisphenol F (DGEBF), polyglycidyl ether of phenol-formaldehyde novolac, polyglycidyl ether of o-cresol-formaldehyde novolac, N,N,N',N'-tetraglycidyl methylenedianiline, bisphenol A novolac, triglycidyl ether of trisphenol-methane, triglycidyl p-aminophenol, 3,4-epoxycyclohexylmethyl-3,4-epoxycyclohexane carboxylate.

The microcapsules may contain any polycyclic olefin conventionally used in this field of the art, for example, a substituted dicyclopentadiene, a substituted norbornene, a substituted cyclooctadiene, and in particular the 5-ethylidene-2-norbornene.

In the preparing step of the mixture, an epoxy flexibilizer and/or a reactive diluent in amounts ranging approximately from 5 to 40 parts w/w for 100 parts w/w of precursor of epoxy polymer can be added to the epoxy resin precursors. As a flexibilizer and/or a reactive diluent, ethers or esters may be used, having long aliphatic chains and including in the structure epoxy groups such as, for example, glycidyl esters, hetero alkylglycidyl ethers, 1,4-butanediol diglycidyl ether, mixtures of octyl-, decyl-, glycidyl ethers.

Among the Hoveyda-Grubbs II catalysts, those in which Ar are mesityl and/or "R is iso-propyl are preferred. Specifically, the dimesityl-1,3-imidazoline-2-ylidene-ortho-methoxy phenyl methylene ruthenium dichloride and the 1,3-di(ortho-isopropylphenyl)imidazoline-2-ylidene-ortho-methoxy phenylmethylene ruthenium dichloride can be mentioned.

Preferably, the heating step is performed at a temperature comprised between 60° C. and 80° C., and has a duration comprised between 24 h and 1 h, and more preferably between 15 h and 9 h. To this heating step, a further heating step at higher temperatures ranging between 140° C. and 170° C., and preferably between 145° C. and 155° C. may follow, in order to improve the mechanical characteristics of the resin.

In preferred embodiments of the invention, the mixture to be heated contains 3 to 10 parts w/w of metathesis catalyst and 5 to 10 parts w/w of curing agent, referred to 100 parts w/w of precursor of epoxy polymer.

Examples of preparation processes of composite materials, according to the invention and comparative, respectively, are now provided by way of illustrative, non-limiting example only, referring to the annexed drawings, in which.

Figure 4:
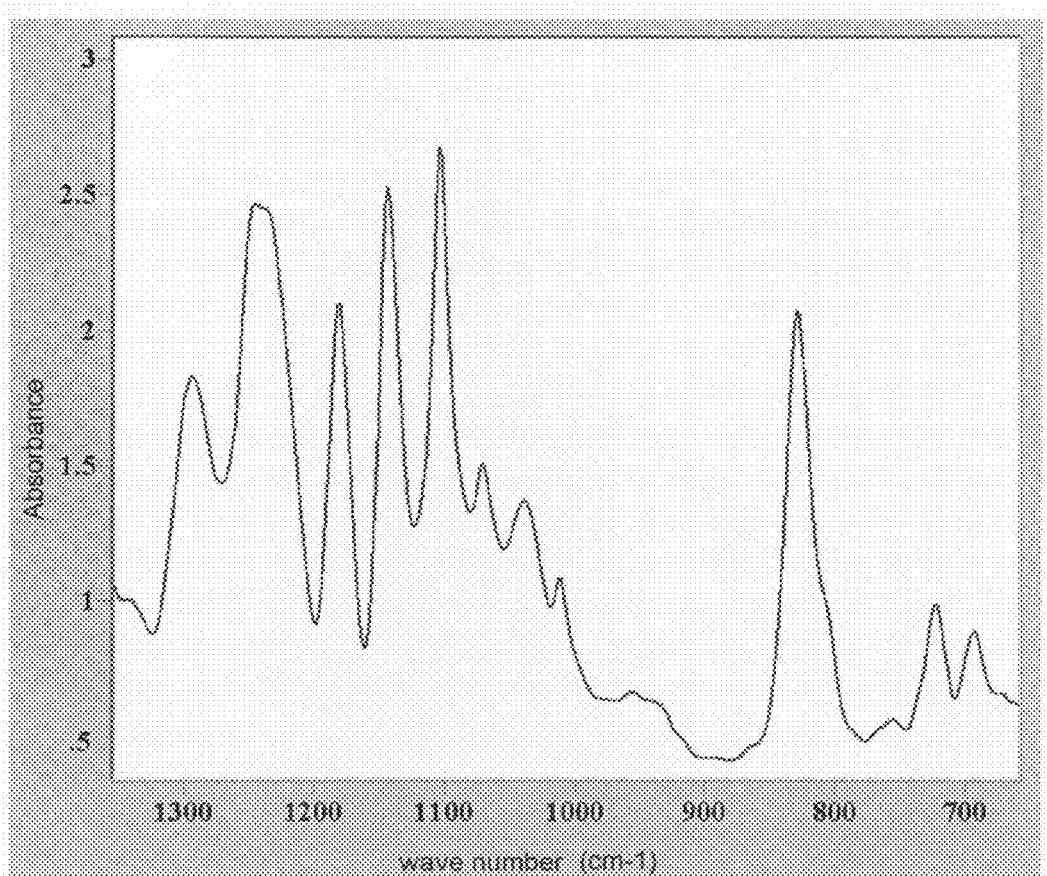
Figure 5:
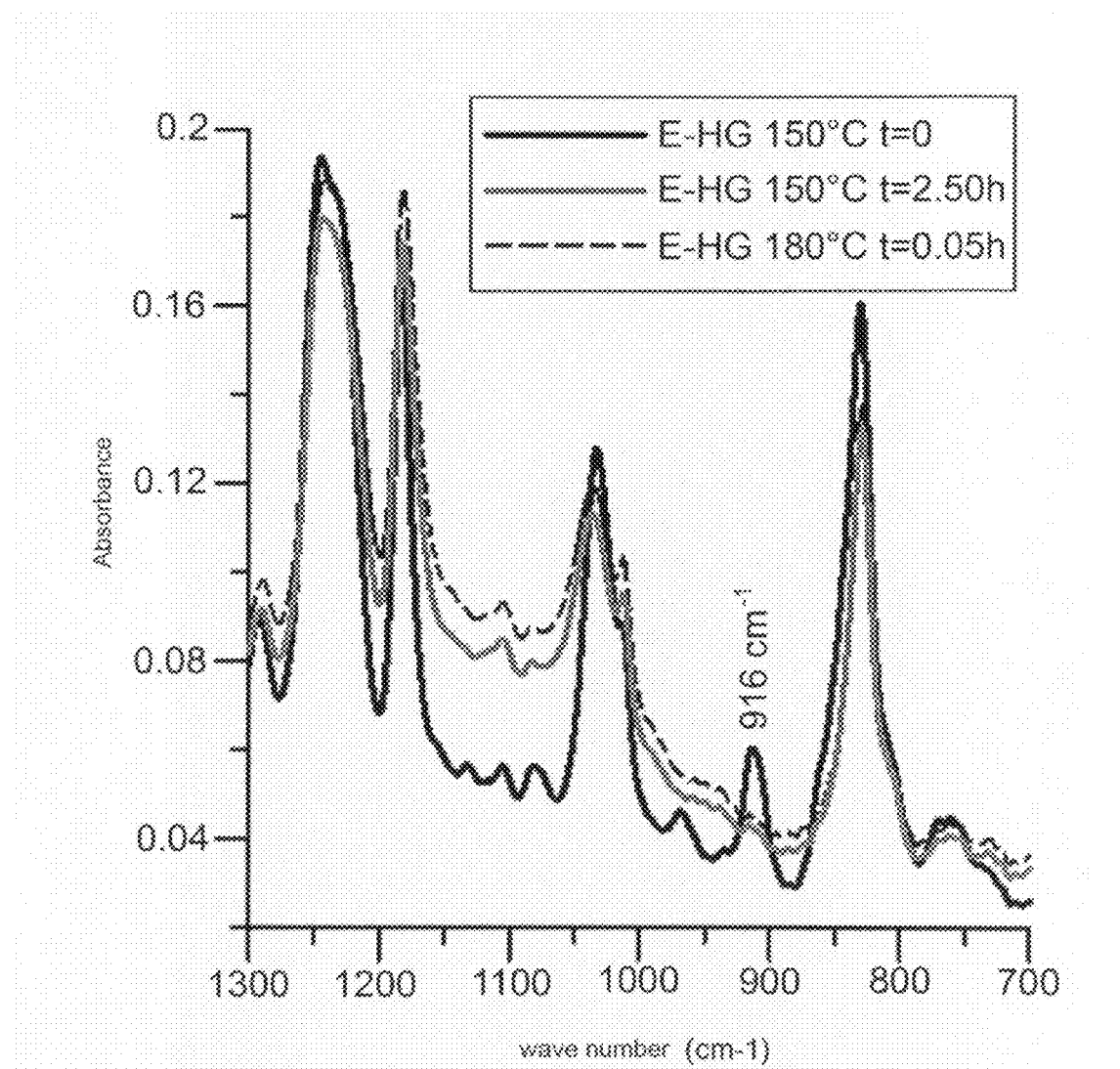

FIG. 4 represents a FT/IR spectrum of the composite material of the Example 5 that has been cured for 12 h at 70° C. and for 2 h at 150° C., and then treated with ENB; and FIG. 5 represents FT/IR spectra of a DGEBA formulation containing 5% catalyst, subjected to heating at different temperatures and for different times.

EXAMPLE 1

A mixture of:

| | |
|---|---|
| DGEBA (precursor of the epoxy resin, trade name EPON 828) | 63 grams |
| Dimer acid diglycidyl ester (flexibilizer, trade name Heloxy 71) | 37 grams |
| 2,4,6-tris(dimethylaminomethyl)phenol (curing agent, trade name Ancamine K54) | 10 grams |
| 1,3-bis-(2,4,6-trimethylphenyl)-2-imidazolidinylidene)dichloro(o-isopropoxyphenylmethylene)ruthenium (catalyst) | 5 grams |
| microcapsules of polyurea-formaldehyde containing ENB | 10 grams | is prepared, and it is heated at 70° C. for 12 hours, thus obtaining a composite material having a matrix of epoxy polymer encompassing the catalyst and the microcapsules that have not been affected by the reactions that led to the formation of such polymer. Then, the composite material is heated at 150° C. for 2 hours, in order to complete the curing process, and to obtain an improvement of mechanical properties such as elastic modulus, glass transition temperature, etc.

In order to verify the suitability of the composite material to develop a self-healing process, one part thereof is crushed in a mortar into finely divided particles. An ENB drop is subsequently added to the particles, in such a manner as to test the catalyst activity.

Figure 1:
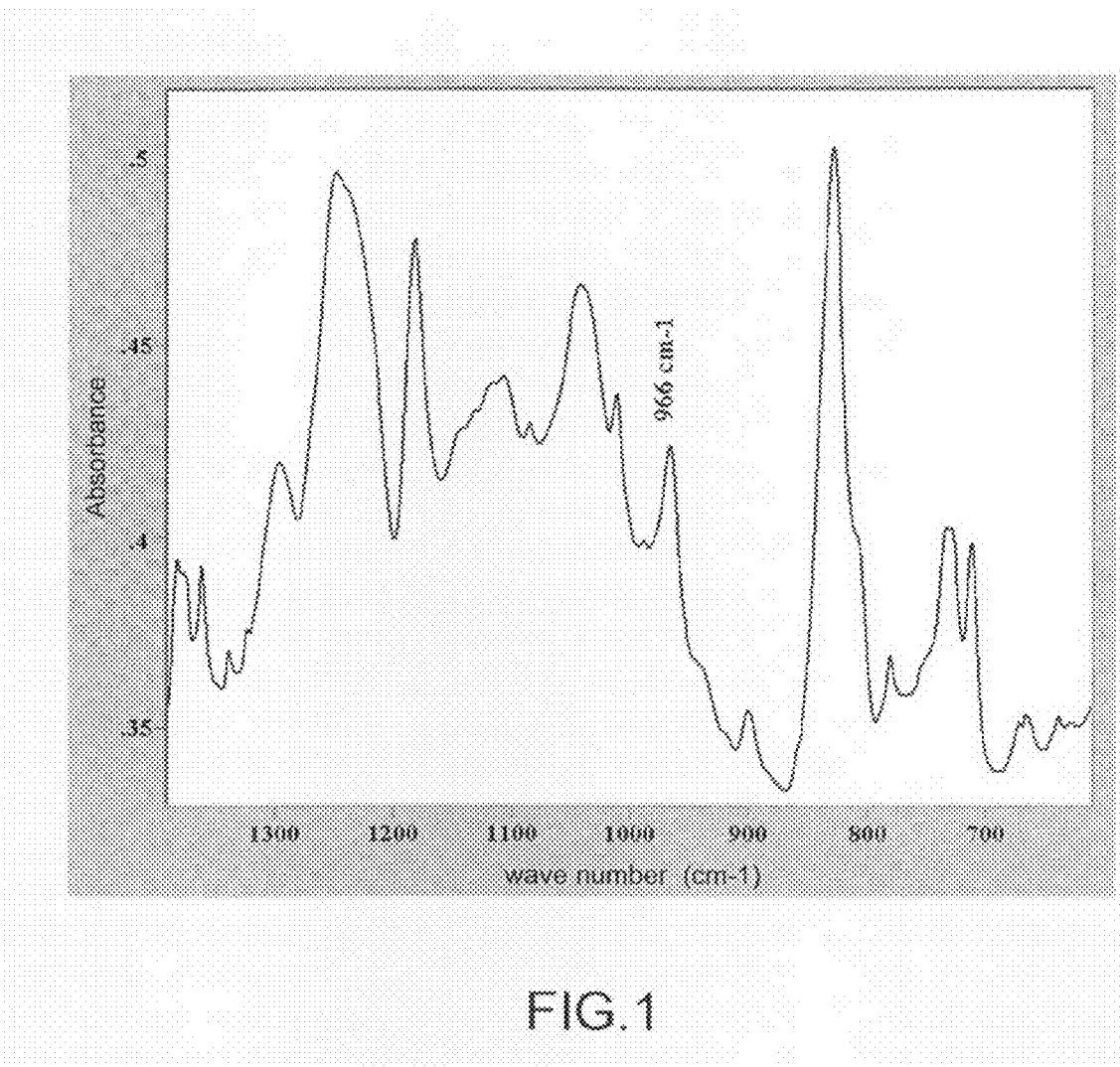
FIG. 1 represents a FT/IR spectrum of the composite material of the Example 1 that has been cured for 12 h at 70° C. and for 2 h at 150° C., and then treated with ENB.

In the FT/IR spectrum (cfr. FIG. 1) of the thus-treated material, a peak at 966 cm$^{-1}$ can be observed, which is indicative of the formation of metathesis products and therefore of the fact that the activity of the corresponding catalyst has not been impaired by the reactions of formation of the epoxy polymer matrix.

EXAMPLE 2 (COMPARATIVE)

Figure 2:
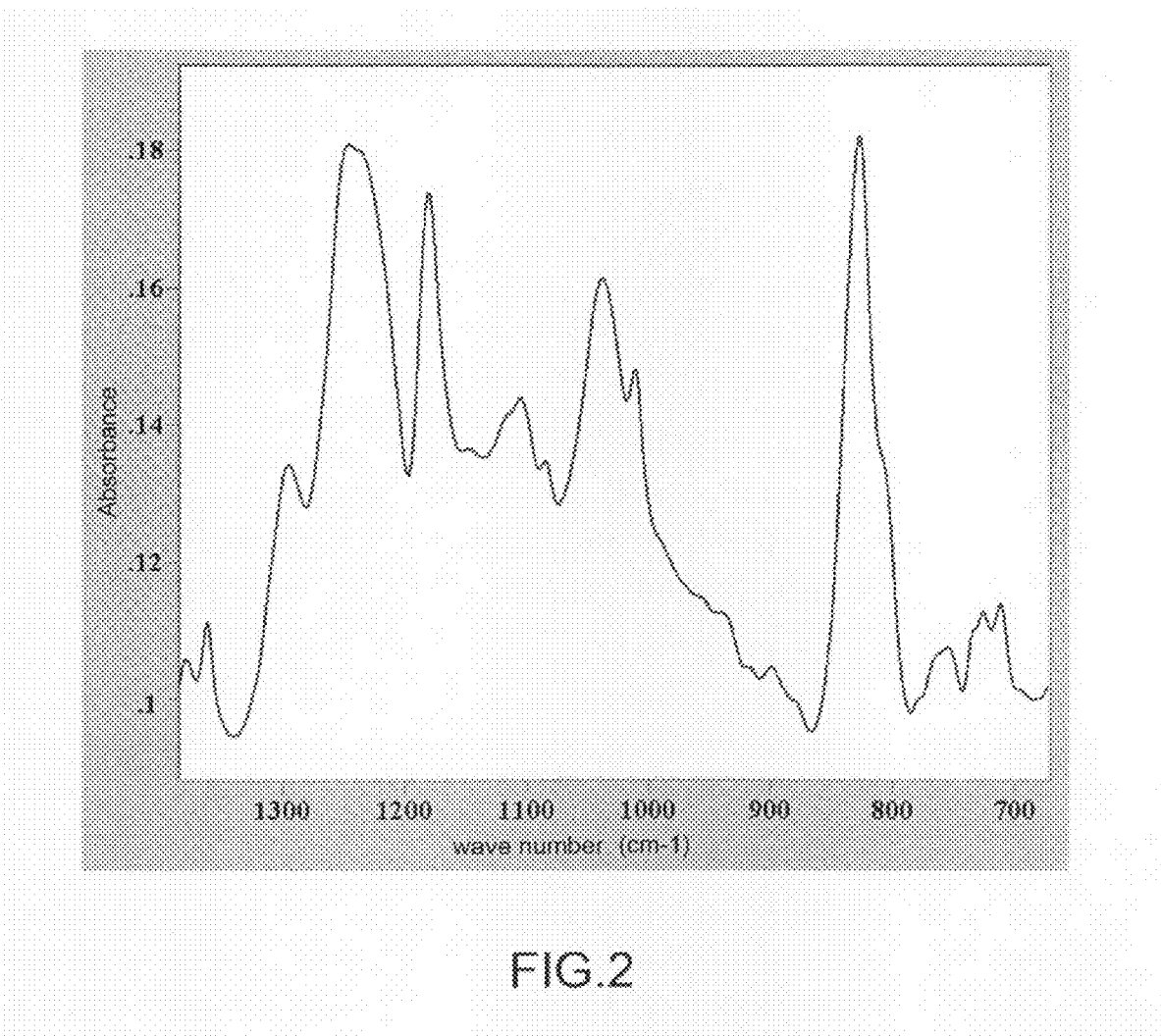
FIG. 2 represents a FT/IR spectrum of the composite material of the Example 2 that has been cured for 2 h at 150° C., and then treated with ENB.

The same mixture of the example 1 is subjected to a heating at 150° C. for 2 hours, without carrying out any preventive treatment at 70° C., as in the case of the example 1. A sample of the thus-obtained composite material was then crushed and added with one ENB drop as in the example 1. In the corresponding FT/IR spectrum (cfr. FIG. 2), no peak at 966 cm$^{-1}$ is observed, demonstrating the absence of metathesis products, and therefore of the inactivity of the corresponding catalyst, which must evidently have previously reacted with the precursor diglycidyl ether of bisphenol A.

EXAMPLE 3

Figure 3:
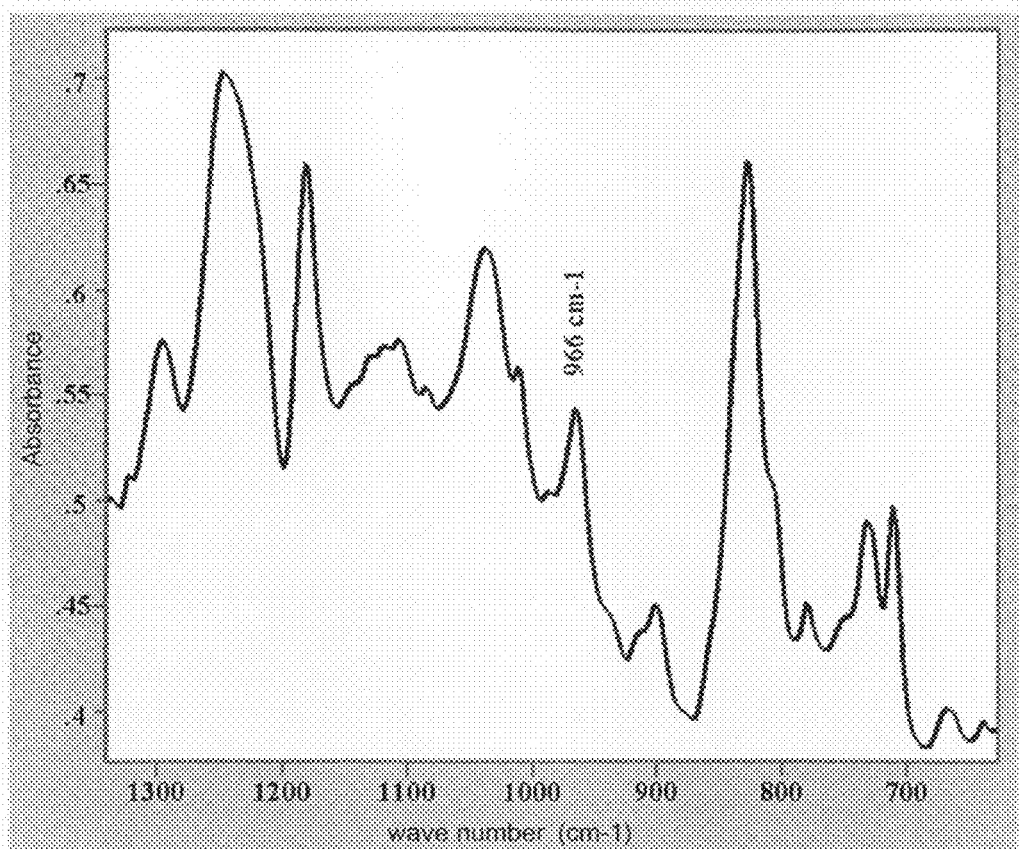
FIG. 3 represents a FT/IR spectrum of the composite material of the Example 3 that has been cured for 9 h at 80° C. and for 2 h at 150° C., and then treated with ENB.

The same mixture of the example 1 is subjected to a heating first at a temperature of 80° C. for 9 hours, and subsequently of 150° C. for 2 h. The treatment of the thus-obtained sample powders with ENB according to a procedure that is similar to the one of the example 1 causes the formation of metathesis products. In fact, the corresponding FT/JR spectrum (cfr. FIG. 3) shows an intense band at 966 cm$^{-1}$, confirming the presence of such products and therefore the activity of the corresponding catalyst.

EXAMPLE 4

The previous example has been repeated with the variations to replace the flexibilizer (dimmer acid diglycidyl ester) with the reactive diluent 1,4-butanediol diglycidyl ether and the curing agent 2,4,6-tris(dimethylaminomethyl)phenol with dimethylethanolamine. Even in this case, the treatment of the sample powders with ENB causes the formation of metathesis products.

EXAMPLE 5 (COMPARATIVE)

The example 1 has been repeated with the variation to use the 4,4'-diaminodiphenylsulfone (DDS) as a curing agent, instead of 2,4,6-tris(methylaminomethyl)phenol. In the corresponding FT/IR spectrum (cfr. FIG. 4), no peak at 966 cm$^{-1}$ is observed, demonstrating the absence of metathesis products. Therefore, from this example it is inferred that the use of a curing agent different from a tertiary amine causes the poisoning of the catalyst, thus impairing the catalytic activity thereof.

Without wishing to be bound to a specific theory, it can be assumed that the curing agents used in the process of the invention promote the cross-linking reactions of the precursor without performing the function of active cross-linking reagent.

The diagram reported below represents the cross-linking reactions which are at the basis of the polymerization process of an epoxy resin, without considering the reaction of the hydroxyl groups with the oxirane rings for the sake of simplification.

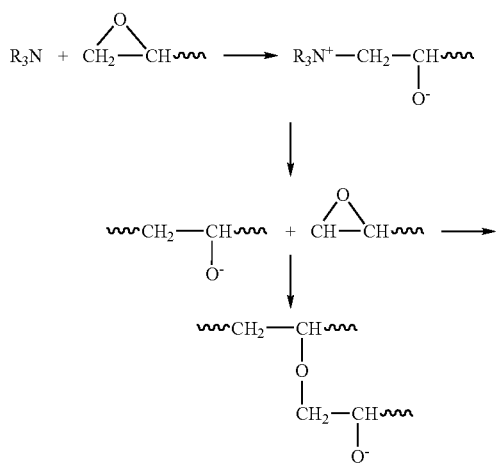

The tertiary amine of the process of the invention acts as a nucleophilic agent, causing the opening of an epoxy group. The thus-formed R—OR⁻ ion is therefore capable of opening an other epoxy ring, and the ring opening reactions continue until obtaining a cross-linked structure, without further interventions of the tertiary amine.

By the process of the invention, the cross-linking reaction is carried out at temperatures that leave the catalyst unaltered. The curing time depends on the corresponding temperature, and in general it can be stated that lower curing temperatures require longer curing times. By selecting, for example, a curing temperature of 80° C., all the oxirane rings of the formulation of the example 1 react within 6-7 hours.

It has been found experimentally that the curing temperature cannot exceed the value of 140° C., because in such case, at least part of the catalyst is deactivated by reaction with the epoxy groups. In this respect, a formulation has been prepared, in which only the precursor of the epoxy resin and a Hoveyda-Grubbs II catalyst are present, and this formulation was monitored by spectroscopic investigation in a temperature range comprised between 100 and 180° C.

Such investigation has been focused mainly on the examination of the 916 cm⁻¹ band, which represents the most characteristic signal of the presence of the precursors of the epoxy resins, being attributed to the asymmetric stretching of the epoxy ring. Instead, the 916 cm⁻¹ band is dramatically reduced and eventually disappears when the resin is cured, as the crosslinking of the precursor monomers of the epoxy resins involves the opening of the epoxy rings as previously reported.

From FIG. 5, it can be inferred that the presence of the catalyst, even in the absence of curing agents, involves a progressive and rapid disappearance of the 916 cm⁻¹ band at a temperature of 150° C. In fact, the spectra at such temperature coincide with those at a temperature of 180° C., with a complete absence of a band at 916 cm⁻¹.

Other tests performed on samples obtained by curing at 180° C. of a complete formulation showed a nearly null self-healing efficiency. This further confirms that the catalyst linked to the epoxy matrix is in reality ineffective in activating the metathesis reaction on which the self-healing functionality is based.

It shall be apparent that, the principle of the invention being understood, the implementation details and the embodiment will be able to be widely varied relative to what has been described by way of example only, without thereby departing from the claimed scope.

What is claimed is:

1. A process for preparing a self-healing composite material for aeronautical structural components comprising a matrix of epoxy polymer, in which a catalyst of ring opening metathesis reaction and microcapsules containing a cyclic olefin having 7 to 40 carbon atoms are dispersed, said process comprising:
 a) preparing a mixture of
  1) a precursor of said epoxy polymer, having at least one oxirane ring,
  2) a tertiary amine curing agent,
  3) a Hoveyda-Grubbs II metathesis catalyst having the formula

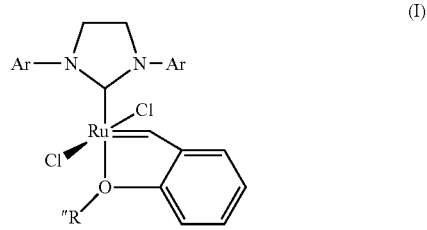

(I)

wherein Ar=aryl having at least one halogen or alkyl substituent and R=alkyl having 1 to 20 carbon atoms, and
  4) microcapsules containing a cyclic olefin having 7 to 40 carbon atoms; and
 b) heating said mixture at a temperature in the range of 25 and 130° C. for at least 1 hour, so as to obtain said matrix of epoxy polymer due to a reaction between precursor and curing agent, which reaction does not substantially involve either said catalyst or said microcapsules,
wherein said tertiary amine curing agent is one that does not impair the activity of the Hoveyda-Grubbs II metathesis catalyst.

2. The process according to claim 1, wherein in the formula (I) Ar are mesityl and/or "R is isopropyl.

3. The process according to claim 1, wherein said catalyst is 1,3-dimesityl-imidazoline-2-ylidene-ortho-methoxyphenylmethylene ruthenium dichloride or 1,3-di(ortho-isopropylphenyl)imidazoline-2-ylidene-ortho-methoxyphenylmethylene ruthenium dichloride.

4. The process according to claim 1, wherein said curing agent is selected from the group consisting of 2,4,6-tris(dimethylaminomethyl)phenol, triethylenediamine, N,N-dimethylpiperidine, benzyldimethylamine, and 2-(dimethylaminomethyl)phenol.

5. The process according to claim 1, wherein said heating step is performed at a temperature comprised between 60° C. and 80° C.

6. The process according to claim 1, wherein said heating step has a duration comprised between 24 h and 1 h.

7. The process according to claim 1, wherein said precursor of epoxy polymer is selected from the group consisting of diglycidyl ether of bisphenol A (DGEBA), diglycidyl ether of bisphenol F (DGEBF), polyglycidyl ether of phenol-formaldehyde novolac, polyglycidyl ether of o-cresol-formaldehyde novolac, N,N,N',N'-tetraglycidyl-methylenedianiline, bisphenol A novolac, triglycidyl ether of trisphenol-methane, triglycidyl p-aminophenol, and 3,4-epoxycyclohexylmethyl-3,4-epoxycyclohexane carboxylate.

8. The process according to claim 1, wherein the mixture to be heated contains 3 to 10 parts w/w of metathesis catalyst and 5 to 10 parts w/w of curing agent, referred to 100 parts w/w of precursor of epoxy polymer.

9. The process according to claim 1, wherein the heating step at a temperature comprised between 25 and 130° C. is followed by a further heating step at a temperature comprised between 140 and 170° C.

10. The process according to claim 1, wherein said cyclic olefin is selected from the group consisting of 5-ethylidene-2-norbornene, substituted dicyclopentadienes, substituted norbornenes, and substituted cyclooctadienes.

* * * * *